May 2, 1944.   E. N. VAN DUZEE   2,348,161
SALT WATER DISPOSAL SYSTEM
Filed June 20, 1942   2 Sheets-Sheet 1
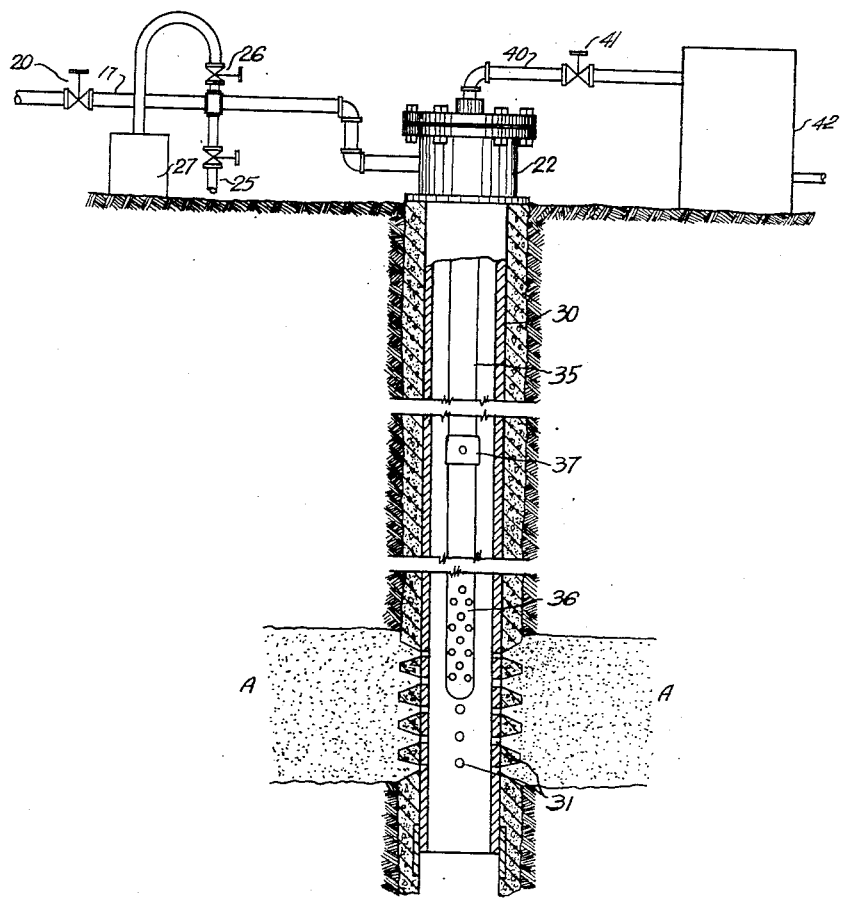
Fig. I
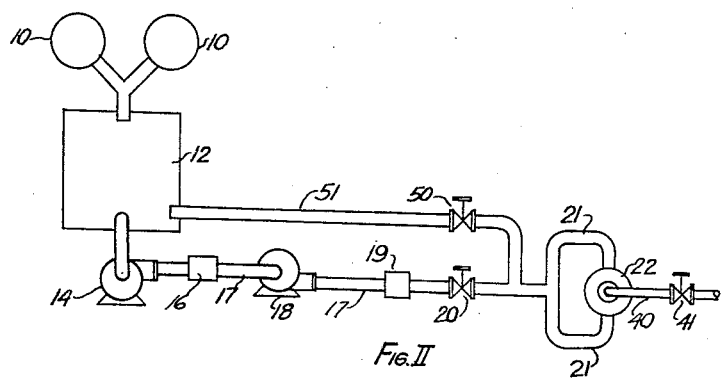
Fig. II
Inventor: E. N. Van Duzee
By His Attorney:

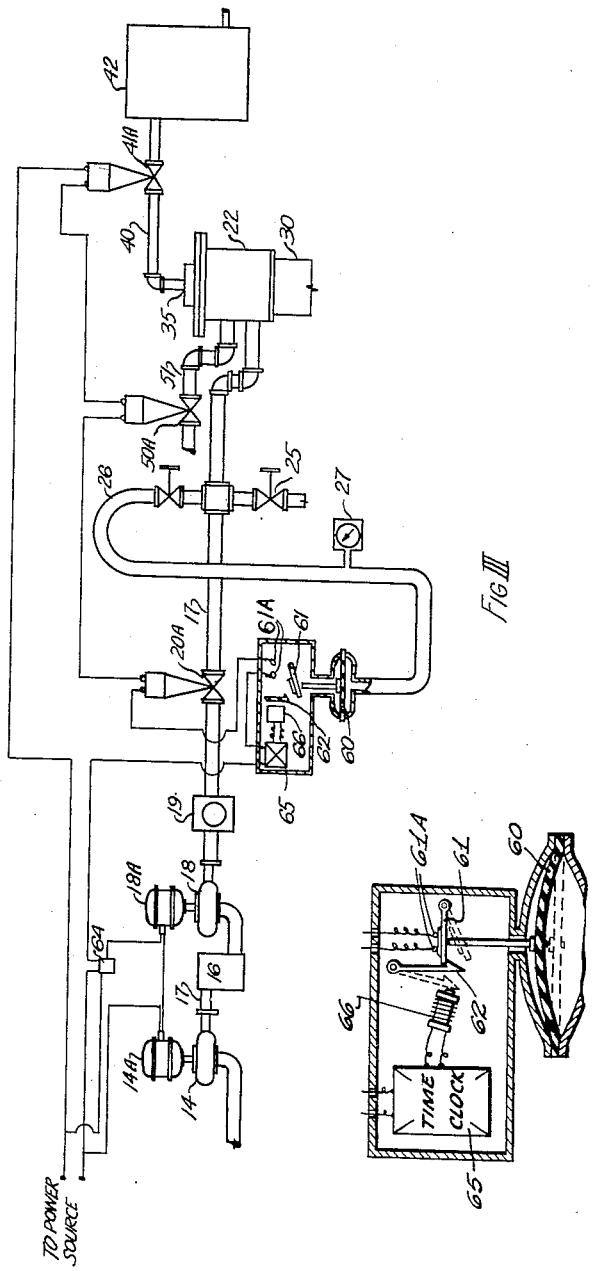

Patented May 2, 1944

2,348,161

UNITED STATES PATENT OFFICE 2,348,161

SALT WATER DISPOSAL SYSTEM

Everett Norwood Van Duzee, Lake Charles, La., assignor to Shell Development Company, San Francisco, Calif., a corporation of Delaware Application June 20, 1942, Serial No. 447,815

3 Claims. (Cl. 166—1)

The present invention relates to salt water disposal and flooding systems, and pertains more particularly to methods of operating the disposal or injection well in such systems.

The problem of salt water disposal is extremely acute in many localities where much water is produced with the oil and evaporation from ponds is insufficient to handle the large volumes of water accumulated. State and local regulations generally prevent diversion of the oil field brines into nearby streams and rivers, since this increases the concentration of salts to a harmful degree.

The conventional way of solving this brine disposal problem is to inject the brine into porous underground layers, using for this purpose exhausted wells or especially drilled wells. However, since oil field brines naturally contain considerable amounts of impurities, the injection face of the well usually becomes rapidly clogged. For example, said brines may contain various dissolved salts and gases in equilibrium therewith, and precipitates may form due to the disturbance of said equilibrium or to oxidation.

Various ways of combating this problem of plugging of the injection face have heretofore been proposed. These include filtering or chemically treating the brine for the removal of precipitable material prior to injection; using closed systems, whereby oxidation is minimized and the chemical balance of the dissolved constituents is not upset; frequently cleaning the sand face of the wells by stopping injection operations and swabbing; or combinations of these methods. However, since very large volumes of brine, often amounting to 10,000 barrels per day, must be handled, and extensive and costly equipment must be used to carry out the necessary operations, these methods are very expensive and require considerable technical skill and control. Further, even though the brine has been thoroughly treated by chemical means and filters, chemical action between the brine and the steel return pipe or casing forms solids which cause stoppage of the receiving formation. The most troublesome element to remove from the water is iron oxide, which, reduced from a ferrous to ferric state by aeration, is insoluble but reluctant to precipitate. The filtering out of the insoluble ferric oxide on the sand face is the cause of much of the clogging and decrease in intake of disposal wells.

It is therefore an object of this invention to provide a simple, convenient, and inexpensive method of disposing of oil field brines and maintaining said brine disposal at a substantially constant rate.

It is still another object of this invention to provide a satisfactory salt water disposal system including convenient and effective means for maintaining the operating efficiency of the injection well.

It is a further object of this invention to provide an improved system for injecting water into porous strata traversed by a borehole, maintaining the injection faces of said strata free from clogging deposits, and removing any such deposits which may accumulate on said faces.

Additional objects and advantages of the invention will be apparent from the following description taken in reference to the drawings, wherein:

Figure I is a vertical sectional view of a disposal well.

Figure II is a schematic plan view of the preferred surface control equipment.

Figure III is a schematic plan view of the surface control equipment of an automatically-controlled embodiment of the present salt water disposal system.

Figure IV is an enlarged schematic view of the automatic valve control mechanism.

Referring to Figure II of the drawings, a preferred embodiment of the salt water disposal system comprises water-collecting gun barrels or separators 10 from which the accumulated brine is drained, preferably into a storage reservoir or pit 12, allowing thorough aeration and opportunity for evaporation, as well as permitting all heavier solids to settle out. A suitable pump 14, such as a centrifugal pump, takes suction from said reservoir 12 and forces the brine into a filter 16 or filters, containing preferably graded sand or other suitable material, in order to remove the main portion of the remaining insoluble material in the brine.

The brine leaving the filter 16 may be forced by means of a suitable pump 18 into the disposal or injection well through a conduit 17 containing a flow-meter 19 for measuring the volume of water directed to the well and a valve 20 for controlling the flow of brine. However, when the water flows into low pressure porous layers the pump 18 may be omitted, if desired. The conduit 17 is preferably divided as shown at 21 (Figure II), for a double connection with opposite sides of the casinghead 22. As shown in Figure I, a small valved bleeder line 25 may be provided near the well to allow sampling of the fluid being injected, and a small valved tube 26 provides communication between the flow conduit 17 and a pressure indicating or recording gauge 27.

The injection well may be formed in any suitable manner and may have, for example, a casing string 30 extending from the casinghead 22 and down past the lowermost receiving stratum and having perforations 31 opposite the desired porous strata.

Passing down through the casinghead 22 and extending some distance into the water standing in the well is a tubing string 35, preferably fitted with a perforated bull plug 36 on its lower end and equipped with joints in the form of flow collars 37. The upper end of the tubing string 35 is in communication with a conduit 40 having a control valve 41 and preferably permanently connected to a source of pressure gas, such as a gas reservoir 42 or compressor, gas well, etc.

In carrying out the method of the present invention, as applied to the preferred embodiment shown in the drawings, and, for example, when inpecting water into low pressure porous layers, the brine collected in the separators 10 from the various wells or well is continually drained into the storage and aerating reservoir 12 wherein the heavy particles are settled out and ferrous iron is converted to the ferric state. The pump or pumps 14 pick up the water from this brine pit or reservoir 12 and pass it through the filter 16, for example, at 28 pounds pressure. Most of the impurities such as iron oxide, insoluble carbonates, etc., which have not been previously removed, are separated during the passage through the filter 16 and are deposited on the face of the graded sand therein.

The water leaves the filter 16 and pump 18 at a suitable pressure such, for example, as 21 pounds and passes through the conduit 17 and double connections 21 into the casing string 30 through the casinghead 22. The meter 19 measures the volume of water directed to the well, providing accurate and permanent records for determining efficiency and performance of the disposal system. Samples of the brine flowing into the well may be taken by means of the valved bleeder line 25. The gauge 27 communicating with the conduit 17 by means of valved tube 26 gives a reading of the pressure or vacuum under which the water enters the well. Under normal operating conditions, in the case of low-pressure porous receiving strata in the well, when the valve 20 is partially closed to regulate the flow of water into the well, the gauge 27 adjacent the well head may record a vacuum such as 5 to 6 inches of mercury, due to hydrostatic suction of the water descending through the casing. The term "pressure" as used herein refers therefore both to positive pressure and negative pressure, i. e., partial vacuum.

After a period of operation such as one or two weeks or more, a gradual increase in pressure at the well head or in the conduit indicates that the formation is no longer taking the water freely under normal conditions. This is usually attributable to a partial sealing of the sand face with a deposit of solids not removed by the filter 16 in conjunction with iron oxides formed by the corrosive action of the water on the steel of the casing 30 and tubing 35, the natural tendency to react being aggravated by aeration. A continued injection of brine would necessitate additional pump pressure to increase the hydrostatic pressure applied against the receiving formation.

To prevent complete clogging of the receiving sand face, brine injection is temporarily suspended by preferably first stopping the pumps 14 and 18 and then closing the valve 20 in the conduit 17. Gas is then injected into the column of water in the well by opening the normally-closed valve 41 in the gas supply conduit 40, allowing the gas to flow down through the tubing string 35 and out through the flow collars 37 and the perforated plug 36.

The introduction of gas into the column of water standing in the borehole lifts the water and causes the hydrostatic pressure therein to be suddenly decreased, permitting a reverse flow of water from the porous strata into the borehole, whereby obstructing matter, which has accumulated on the face of the porous strata, is dislodged and the faces of the strata cleaned. The gas introduction further causes the water and at least part of the accumulated obstructing matter and loose sand to be ejected from the well and expelled to the storage and settling pit 12 or other suitable disposal pit through an auxiliary flush-out line 51 connected to the conduit 17 on the well side of the valve 20. The valve 50 in this auxiliary line 51 is usually opened when the gas control valve 41 is opened. After the sealing solids and accumulated sand are thus quickly removed from the wells, brine flow into the well and the reopened receiving strata may be resumed.

If desired, the above operations may be carried out automatically without the necessity of requiring the attendance of an operator. For example, suitable means may be provided, as shown in Figure III, whereby, when pressure in line 17, as measured by the pressure gauge 27, rises to a predetermined value, the valve 20A is actuated into closed position and gas inlet valve 41A and discharge valve 50A are actuated into open position and after a predetermined period of time said valves are caused or allowed to return to their normal position. Such means may comprise, as shown most clearly in Figure IV, a diaphragm 60 exposed to the pressure in the line 17 through the pipe 26, a pivoted switch bar 61 adapted to be actuated, i. e., swung upward, into closed position, electrically connecting electrical contacts 61A, when the pressure on the the diaphragm reaches said predetermined pressure, a latch 62 for holding said switch in closed position, a delayed-action mechanism for releasing the engagement of the latch 62 with the switch 61 and thereby opening said switch 61 (the open position being shown by dotted lines in Figure IV) after a predetermined time period, and an electrical circuit controlled by said switch 61 and comprising a source of electrical current, and electrical means associated with each of valves 20A, 41A and 50A for operating said valves simultaneously. The electrical circuit may also include in series therewith suitable electrical means for interrupting the operation of the prime movers for the pumps 14 and 18, such as a circuit interrupter 64 in the electrical circuit to the electrical prime movers 14A and 18A, which interrupter 64 is adapted when energized to open the circuit to the prime movers and when de-energized adapted to close said circuit, so that the pumps 14 and 18 are stopped and restarted with the closing and opening, respectively, of the valve 20A. The electrical means for actuating valve 20A into closed position and valves 41A and 50A into open position may comprise a solenoid acting directly on the valve stem or a solenoid actuating a pilot valve admitting pressure fluid to the diaphragm of diaphragm-motor type valves in any well-known or suitable manner. The valves are provided with suitable means, such as springs, for returning the valves to their normal position when the electrical means associated therewith are deenergized. The delayed-action mechanism may comprise any suitable timing device, such as a time clock 65 in the electrical circuit adapted to energize an electro-magnet 66 adjacent said latch 62 after a certain period of time, whereby the switch 61 is allowed to return to its normal open position, as shown in dotted lines in Figure IV.

The successive operational steps of injecting water into the porous strata traversed by the well, stopping water injection and injecting gas into the well, allowing back flow of brine from the strata to the well to clean the sand face, removing the water and obstructing matter from the well by gas pressure, and resuming water injection into the porous strata—are repeated as often as desired.

The present brine disposal system has been found highly satisfactory in actual practice. The step of removing obstructing matter and accumulated sand from the well by gas pressure injection furnishes a convenient and effective way of maintaining operating efficiency of the input well, and the disposal system provides a steady outlet with insignificant interruptions for large volumes, such as 10,000 barrels, of water daily. The ability to dispose continually of such large quantities of water enables the producing well operators to produce the wells at high rates of fluid production during the depletion stages and thereby to materially enhance both daily and ultimate recovery as prolific volumes of fluid must often be handled.

It will be readily seen that various modifications may be made in the above-described method, which is merely illustrative of the present invention as defined by the appended claims. Thus, while the preferred embodiment describes an aeration and settling pit and filtering means, such pretreatments of the brine as well as systems closed to exposure to air, or closed systems maintained at high pressure, according to U. S. Patent No. 2,230,001, may or may not be used, as desired, in combination with the present salt water disposal method, depending upon the nature of the brine, its dissolved salts and gases, and the amounts of these constituents.

I claim as my invention:

1. A water disposal system comprising an injection well traversing porous strata adapted to receive the water, conduit and casing means for injecting said water into the desired porous strata, tubing means depending into the well within said casing to a point below the normal water level in said well, a source of pressure gas, conduit means connecting said pressure gas source to the upper portion of said tubing means, discharging conduit means opening from the annular space between said casing and tubing means, normally open valve means in said water injecting conduit, normally closed valve means in said pressure gas conduit, and control means responsive to the pressure in said water injecting conduit adapted to close said first valve means and to open said second valve means in response to a predetermined pressure rise in said water injecting conduit.

2. A water disposal system comprising an injection well traversing porous strata adapted to receive the water, conduit and casing means for injecting said water into the desired porous strata, tubing means depending into the well within said casing to a point below the normal water level in said well, a source of pressure gas, conduit means connecting said pressure gas source to the upper portion of said tubing means, the annular space between said tubing means and said casing means forming a passage for downward flow of injected water when water is being introduced and for upward flow of water and gas when gas is being injected through said tubing means, discharging conduit means opening from said annular space, normally open valve means in said water injecting conduit, normally closed valve means in said gas pressure conduit, and control means responsive to the pressure in said water injecting conduit adapted to close said first valve means and to open said second valve means in response to a predetermined pressure rise in said water injecting conduit, said control means including timing means activated in response to said predetermined pressure rise and adapted to open said first valve means and to close said second valve means after a predetermined time period.

3. A water disposal system comprising an injection well traversing porous strata adapted to receive the water, conduit and casing means for injecting said water into the desired porous strata, tubing means depending into the well within said casing to a point below the normal water level in said well, a source of pressure gas, conduit means connecting said pressure gas source to the upper portion of said tubing means, discharging conduit means opening from the annular space between said tubing and casing means, normally open valve means in said water injecting conduit, normally closed valve means in said gas pressure conduit, and control means adapted to reverse the opened and closed positions of said first and second valve means in response to a predetermined pressure rise in said water injecting conduit, said control means including timing means initiated into operation in response to said predetermined pressure rise and said reversal of the valve positions and adapted to return both said valve means to their normal opened and closed positions after a predetermined time period from said reversal of positions of said valve means from the normal.

EVERETT NORWOOD VAN DUZEE.